Patented Feb. 21, 1939

2,147,772

UNITED STATES PATENT OFFICE

2,147,772

THERMO-ADHESIVE TAPES OR THE LIKE

Ernest L. Kallander, Framingham, Mass., assignor to Dennison Manufacturing Company, Framingham, Mass., a corporation of Massachusetts No Drawing. Application September 25, 1937, Serial No. 165,766

1 Claim. (Cl. 91—68)

This invention relates to thermo-adhesive paper tapes or similar thin, flexible articles coated with thermo-adhesive compositions and designed to be stuck or bonded to their own and other surfaces under the momentary application of moderate heat thereto. One exacting sphere of use for thermo-adhesive tape is the application of such tape as a binder about the skirt portion of a hood of "Cellophane" or equivalent sheet material sometimes used to protect the mouth of a milk bottle. For such purpose, the thermo-adhesive coating on the tape should properly be possessed of various combined qualities, including quick acquisition of adhesive or bonding quality under the application of moderate heat, strong adhesiveness or bond even to very smooth surfaces, such as "Cellophane", both while it is in plastic or thermo-activated state and after it has set, little tendency to slip or flow away from its base or the surface against which it is applied in its thermo-activated state, and sufficient hardness or freedom from plasticity under room or prevailing temperature conditions to resist "blocking" or sticking to itself when in pile or roll form. It is further desirable that the thermo-adhesive coating be waterproof, non-toxic, free from malodor, and of attractive appearance.

It is known that polyvinyl resins answer admirably many of the foregoing requirements for a thermo-adhesive coating. However, those polyvinyl resins, such as polyvinyl acetate and/or polyvinyl chloride, that have the desired quick thermo-adhesive response, are generally too prone to be possessed of sensible plasticity or "flow" at room temperatures, especially those likely to prevail in the summertime or near a steam radiator, in consequence of which superposed plies of material coated therewith, such as a roll of tape coated therewith, may in effect become a solid block whose plies are so bonded or fused together as to be practically useless. I have found that there are various substances compatible with polyvinyl resins and capable of hardening them sufficiently to do away with their undesirable plasticity or "flow" characteristics at room or prevailing temperatures and that shellac is especially useful for this purpose in that it does not materially detract from the strong thermo-adhesive bond to be had from a polyvinyl resin coating itself. On the other hand, the blending of shellac or equivalent hardening agent with polyvinyl resin in amount sufficient to yield a thermo-adhesive coating composition of the desired hardness or non-plastic character at room temperature is attended by an undesirable increase in the softening point of the composition; that is, its thermo-adhesive response is adversely affected unduly by the shellac or equivalent hardening component. I have further found, however, that there are other resins compatible with both the polyvinyl resin and the shellac and capable of serving as fluxing agents for both these latter ingredients without detracting significantly from the strong bond to be had from the polyvinyl resin alone or from the blend of such resin with the shellac. Thus, I have found that the artificial resins marketed by Hercules Powder Company under the trade-mark "Petrex", e. g. "Petrex No. 13", are especially valuable as fluxes for shellac-polyvinyl resin compositions in the sense that they can be blended therewith in amount to impart to the resulting blends quick thermo-adhesive response while enabling the attainment in the resulting blends of the various other desiderata hereinbefore mentioned, including adequate hardness at room temperature, strong or tenacious bond to various surfaces, etc. These various "Petrex" resins are prepared by condensing derivatives of the terpene series with suitable polycarboxylic organic acids, such as succinic and maleic acids, and esterifying with suitable polyhydric alcohols, such as the aliphatic polyhydric alcohols. They are available as resins of various softening or melting points, but for the purposes hereof, it is preferable that the "Petrex" resin employed be of a softening or melting point range of about 90° to 130° F., as determined by a somewhat modified penetrometer method of measuring softening points hereinafter described. The "Petrex" resins are characterized by their hardness or resistance to "flow" at room temperature and their comparatively sharp softening or melting points as well as their excellent compatibility with both polyvinyl resins and shellac. In using the term "compatibility" herein as applied to the "Petrex" resin and the shellac, I mean the ability of these substances to form a substantially homogeneous or non-separating mixture or blend with the polyvinyl resin and with each other either upon being fused under heat or upon being treated with various organic liquids or organic liquid mixtures constituting solvents common to all these three substances.

It might be noted that a "Petrex" resin alone is wholly unsatisfactory as a thermo-adhesive coating by reason of the fact that it tends to run or melt away from the work to be bonded and does not give an adequately tenacious bond, particularly in moist or thermo-activated state. The unsuitability of the "Petrex" resins in this regard is readily appreciated from their relatively low and sharp melting points. I have found that for some purposes, however, a thermo-adhesive composition consisting essentially of a blend of the polyvinyl resin and "Petrex" resins, such as hereinbefore described, may be satisfactory, particularly when the vinyl resin content represents about 25% to 60% by weight of the blend. Yet, in the absence of shellac or equivalent hardening agent, such a blend tends to display placticity or "flow" at room temperature sufficient to cause bonding or "blocking" of the superposed plies or convolutions of a roll of tape coated therewith; and a coating thereof is apt under thermo-activation to become too fluent or mobile for yielding satisfactory results on thermo-adhesive tapes to serve as binders about bottle hoods or for other exacting purposes. Accordingly, while the present invention comprehends thermo-adhesive coating compositions consisting essentially of polyvinyl resins and the "Petrex" resins, yet the preferred coating compositions hereof contain also shellac or equivalent hardening agent, as already described.

There are gums or resins that might be used in lieu of or together with the shellac as hardening agents in the thermo-adhesive coating compositions hereof, including colophony or ordinary rosin. However, because ordinary rosin detracts materially from the bonding tenacity of the composition hereof when used in amount to harden the composition adequately, probably imparting in some measure to the polyvinyl resin its own brittleness or friability, it is not to be recommended as a shellac substitute in the coating composition hereof, excepting when the composition is to serve purposes requiring only a comparatively low degree of bonding tenacity. Again, it is possible to replace the "Petrex" resins in the thermo-adhesive coating compositions hereof by other suitable fluxing resins or gums, such as alcohol-soluble ester gum and a paracoumarone indene type of resin. However, such other fluxing resins as I have investigated for the purpose of the coating compositions hereof are inferior to the "Petrex" resins especially as regards their compatibility with the polyvinyl resins and shellac; and I hence distinctly prefer to use the "Petrex" resins as fluxes in the coating compositions hereof.

The present invention will now be described more specifically in terms of the manufacture of thermo-adhesive paper tape to be used in binding in place the skirt portions of a "Cellophane", paper, or equivalent hood about the external neck walls of a milk bottle. In this connection, it might be remarked that the hoods must be pulled down over the tops of the filled bottles and bound in place very quickly and, accordingly, that the thermo-adhesive tape used for such purpose must develop thermo-adhesiveness almost instantly. Indeed, the hooding machines are usually designed to run the bottles at a rate upwards of 60 per minute; and, it is thus seen that the hot irons or clamps of the machine employed for activating the tape and causing it to bond to the "Cellophane" or other hood material and its end portions into lapping relationship have very little time in which to accomplish these desired results. Although the tape-activating irons are preferably maintained very hot (upwards of 500° F.), the time of pressure contact between the irons and the tape is so short that the temperature imparted to the tape is much lower (probably downwards of 300° F.) and, in any event, moderate enough not to scorch or otherwise injure the tape. The paper base for such tape is preferably surface-sized and surface-filled, as with a casein coating composition containing clay or other filler and, if desired, pigment or dye. Because of the smooth surface and low penetrability of such paper base, a minimum amount of the composition hereof is necessary for developing a thermo-adhesive coating of requisite thickness and, upon being thermally activated, the coating does not tend to sink or become dissipated into the body of the paper.

The thermo-adhesive compositions for coating such a paper base may be prepared by dissolving approximately six parts by weight of "Vinylite A7", two parts of shellac, and two parts of "Petrex No. 13" in an amount of volatile organic solvent to form a solution of, say, about 40% solute content, at which solute content the solution may be readily and smoothly spread on the paper surface. The "Vinylite A7" has a softening point of about 148° F. and the "Petrex No. 13" has a softening point of about 101° F., as measured by the penetrometer method hereinafter given; and the shellac, which is preferably one of good commercial grade, cleanliness, solubility, and normal wax content, has a softening point of about 157° F. Shellac that is of undue age or that has been degenerated by heat is unsuitable for the thermo-adhesive compositions hereof. A good medium for blending or dissolving the foregoing three components constituting a preferred thermo-adhesive composition hereof is made up by weight of 25 parts of denatured alcohol, 15 parts of benzol, and 10 parts of ethyl acetate. The resulting physically homogeneous solution, which is a comparatively thick or viscous liquid, may be spread onto the surface of the paper by any suitable machine, for instance, by the conventional spreading machine wherein a knife or doctor blade serves to regulate the thickness of coating deposited on the paper. The solution may be applied to a web of the paper as it is being progressively run through the machine to deposit a smooth coating in an amount or thickness of, say, about 7 pounds of solids or thermo-adhesive composition over a paper area of 250,000 square inches, whereupon the solution-coated paper may be passed progressively over hot drying rolls or through a hot-air drying chamber to evaporate the solvent and the dried paper cooled to about room temperature preparatory to being wound into a roll. The coated paper may then be progressively unwound from the roll and cut into the desired narrow ribbons or tape, which may be wound into rolls for storage and shipment.

It is generally preferable that the back or inactive face of the thermo-adhesive tapes hereof be coated with a cellulose derivative, such as nitrocellulose or cellulose acetate, as such a coated surface bonds better to the activated thermo-adhesive coating than a plain paper surface and it also tends to inhibit blocking of the rolled or convoluted tape. Accordingly, the back or inactive face of the paper to be cut into the tape hereof is preferably coated with nitrocellulose or equivalent cellulose derivative solution. Only a very thin coating of the nitrocellulose need be carried by the back face of the tape, for instance, a coating amounting to as little as about 1.5 pounds of nitrocellulose per 250,000 square inches of paper surface. The nitrocellulose coating may be deposited and dried on the paper in very much the same way as the thermo-adhesive composition from a nitrocellulose solution of, say, about 8% guncotton content (70-second viscosity guncotton) in acetone. Of course, nitrocellulose solutions of various other concentrations prepared from other kinds of guncotton and other nitrocellulose solvents might be employed. In some instances, the nitrocellulose solution applied to the paper may advantageously contain a nitrocellulose-plasticizer, as a plasticizer tends to keep the sheet flat, that is, to destroy such curling tendencies as might otherwise exist therein. However, the plasticizers employed for this purpose should not be such usual nitrocellulose-plasticizers as tricresyl phosphate and dibutyl pthallate, as these also have a decided plasticizing or solvent action on the thermo-adhesive compositions hereof and hence tend to cause blocking of the rolled thermo-adhesive tapes hereof when used in the nitrocellulose or back face coating of such tapes. There are particular nitrocellulose-plasticizers that have very little plasticizing effect on the thermo-adhesive compositions hereof; and it is only such plasticizers, if at all, that I employ in the nitrocellulose or back face coating of the thermo-adhesive tapes hereof. Among such plasticizing agents may be mentioned the alkyl acetyl ricinoleates, particularly butyl acetyl ricinoleate, which, although very effective in its plasticizing action on nitrocellulose, have insignificant plasticizing or solvent action on the thermo-adhesive compositions hereof. Thus, I have used various artificial resins, such as alkyd, phenolic and vinyl resins, in the nitrocellulose or back face coating of the thermo-adhesive tape hereof in the amount of 30% and higher, based on the weight of the nitrocellulose, without encountering blocking troubles in the rolled tape. Indeed, I have worked with coating compositions for the back face of the tape containing from about 30% to 80% of such artificial resins in combination or compounded with cellulose derivatives, such as cellulose nitrate, and have found that the resulting compositions or compounds lead to a back-face coating which exhibits the desired strong bonding affinity with the activated thermo-adhesive coating composition on the active or front face of the tape and at the same time is sufficiently hard or non-plastic at room temperature to obviate "blocking" or coalescing tendencies in the rolled tape when such tape is stored indefinitely at ordinary or prevailing temperatures. Specifically, I have used to excellent advantage a back-face coating on the tape consisting essentially of 25% nitrocotton and 75% polyvinyl resin, which coating may exist as an extremely thin deposit on the back face of the tape or paper base corresponding in weight or thickness to the deposit, hereinbefore cited, of substantially plain nitrocellulose coating for the back-face of the tape. Such nitrocotton polyvinyl resin coating composition may be conveniently applied to the back face of the tape or paper base as a fluent solution of about 15% to 20% solids content in a suitable organic solvent or mixture of solvents, say, a mixture of equal parts of ethyl acetate, denatured alcohol, and benzol. The invention hereof is not, however, limited to the use of any particular coating composition on the back face of the tape, since it is possible to use various back-face coating compositions, provided that they bond with sufficient tenacity to the activated thermo-adhesive composition on the active face of the tape and are sufficiently hard or non-tacky at prevailing temperatures to inhibit blocking of the plies or convolutions in a roll of the tape. Generally speaking, however, the artificial resins are preferred in the back-face coating composition, since they have the desired strong bonding affinity for the activated thermo-adhesive composition on the tape; but they ordinarily require the use of at least about 20% of a cellulose derivative, such as cellulose nitrate or cellulose acetate, to acquire the desired quality of hardness or non-tackiness at prevailing temperatures to resist coalescence or amalgamation with the thermo-adhesive coating composition. While it is possible to select artificial resins of sufficient hardness or non-tackiness at normal temperatures to dispense with the need for compounding them with cellulose derivative in preparing the back-face coating composition, yet the use of such resins by themselves as a back-face coating composition bespeaks some sacrifice of bonding tenacity with the activated thermo-adhesive composition; and it is hence preferable to work with artificial resins of a lower degree of hardness or polymerization and to obviate such undesirable degree of plasticity as may be exhibited thereby at prevailing temperatures by compounding therewith upwards of about 20% of a cellulose derivative, as already indicated.

It is possible to vary the proportions of each of the components of the thermo-adhesive coating compositions hereof while realizing to a satisfactory degree the various desiderata already noted for the thermo-adhesive tape coated with such compositions. It is preferable, however, that the thermo-adhesive composition or coating of such tape have a softening point ranging from about 115° to 145° F. as measured by the method hereinafter given, and be sufficiently strongly adhesive or bonded at such temperatures to enable the lapping of end portions of the tape into a ring about a bottle neck without break-away or parting of the lapping portions immediately upon removal of the momentary lapping pressure of the hot clamping irons under the parting stress existing at such portions. I have found that a thermo-adhesive coating composition containing the three specific components of the example hereinbefore given answers the foregoing and other requirements with its content of shellac ranging from about 15% to 50%, its "Vinylite A7" content ranging from 25% to 75%, and its "Petrex No. 13" content ranging from about 15% to 50%. All factors considered, including suitably low softening point and tenacity of bond in both thermo-activated and set states, I have found that a thermo-adhesive coating composition containing the proportions by weight of these three components (20 "Petrex" resin, 20 shellac, and 60 vinyl resin), as prescribed in the example hereinbefore given, represents an optimum composition for the purposes hereof, for its softening point, about 125° C., is very quickly attained with very little danger of injuring the paper base on which it occurs as a coating and with little tendency for the coating to become slippery or so fluent as to run off the paper base; and it bonds strongly at such temperature, insomuch that an attempt to break the bond results in considerable "stringing out" of the composition rather than a sudden rupture of the bond.

It should be noted that the limiting proportions or ranges of the three components of the compositions hereof, although cited for three specific and preferred components having particular or fixed characteristics, are not fixed, but are subject to variation, depending, for example, upon the particular characteristics of the specific polyvinyl resin employed and of the specific "petrex" resin or other flux employed. It might further be noted that while it is preferable to apply the thermo-adhesive coating compositions hereof to paper as solutions in suitable volatile organic solvents or solvent mixtures, yet it is possible to fuse or melt the three solid components of such compositions and thereby blend them to form a physically homogeneous, liquid or fused mixture and to heat the mixture to about 250° to 300° F., at which temperatures the fused mixture is sufficiently fluent to enable smooth and easy spreading on a paper surface, whereupon the spread coating of thermo-adhesive composition carried by the paper may be allowed to set or congeal to its normally glossy and non-tacky state.

The thermo-adhesive coating compositions hereof may be applied to various articles, which, like tape, are designed to be bonded by thermal activation to their own and to other surfaces; and the term "tape" as used herein is hence intended to include articles that are similar in composition and broad purpose to the particular tape hereinbefore described. Thus, such compositions may be applied as coatings to labels, stickers, fabric, or other articles intended to be bonded by thermal activation to various surfaces, particularly very smooth or glossy surfaces resistant to sticking by common adhesives. The thermo-adhesive compositions hereof may also be applied as coatings to such smooth or glossy sheet materials as metal foils and "Cellophane" whose sticking by ordinary adhesives cannot be satisfactorily accomplished.

It might be noted that "Vinylite A7" is the acetic ester of polyvinyl alcohol and that the chloride esters as well as the acetic esters are also useful for the purposes hereof. Indeed, the vinyl resins for the purpose hereof may be mixtures or compounds of the chloride and acetic esters or other vinyl resins having the desired properties and put out under such a variety of trade names as "Gelva", "Alvar", "Formavar", "Vinnapas", "Mowillith", "Vinyloid", and "Vinylite". It might be further remarked that there are other artificial resins that have physical and chemical characteristics more or less similar to those of the vinyl resins and that may be used for the purposes hereof in lieu of the vinyl resins. Thus, the more soluble of the polystyrol resins, which are sold under the trade names "Victron" and "Resoglaz" may be used in lieu of the vinyl resins. Other artificial resins serviceable for the purposes hereof in lieu of the vinyl resins are the so-called acrylate resins, for instance, those sold under the trade names "Pontolite" and "Acryloid". These acrylate resins are usually alkyl esters of acrylic acid and methylacrylic acid that polymerize under suitable conditions to yield resins of a hardness, solubility, and a rubbery or stringy adhesiveness or tackiness under the action of heat or relatively small amount of solvent similar to that displayed by the vinyl and styrol resins. In using the expression "vinyl resins" in the foregoing description and in the appended claim, I means to include thereby also those styrol resins and acrylate resins whose properties or behavior are more or less akin to the vinyl resins; and in this connection, it might be noted that all of these resins are characterized by being derivatives or compounds in which the ethylene linkage is relied upon for the polymerization into resins exhibiting the desired properties (see, for example, the book on "Artificial Resins" by Scheiver and Sanding, published by Pitman & Sons, Ltd., London, and sold by the Industrial Book Company, Inc., 280 Broadway, New York, N. Y., for the chemistry of these reactions).

The melting points hereinbefore noted were determined in the following manner. A 10-gram sample of resin is put in a round tin dish having a diameter of 2" and a height of ½". The resin is melted over a Bunsen burner; and, if there are several components, they are stirred together thoroughly until well mixed. The resin is then placed in an oven at 100° centigrade for about one-half hour, taken out and put in a dish of water at about the same temperature. It is then placed on the platform of a "Dow penetrometer", which is described in Eimer and Amend's catalogue of 1927 (Catalogue No. 16386). This penetrometer is used for asphalt testing and is designed on the same principle as the New York Testing Lab type, but is not equipped with stop clock work. This is the instrument used for asphalt-testing as specified in the procedure given by the American Society of Testing Materials. The weight of the needle frame work for weighting the needle is 50 grams, that is, that is the tare weight, and one division on the scale corresponds to a needle travel of .001 of 1 centimeter. A 100-gram weight is placed on the weighing platform; and the needle, which is a ⅛" brass rod slightly rounded at the end, is brought in contact with the resin, the reading noted, and the holding lever released. After 15 seconds, the reading is noted and the penetration recorded, as well as the temperature at that time, by means of a thermometer in the water jacket. Successive readings are taken—as many as possible—as the material cools down, preferably at 10° Fahrenheit intervals. These successive needle-penetration readings are taken, of course, under separate applications of the weighted needle at the different observed temperatures of the resin being tested and are plotted as the ordinates on coordinate graph paper with the observed temperatures of the resin on the coordinate scale. A smooth curve is drawn through the points representing the conjunctive penetration and temperature conditions of the resin and the temperature point at which the curve intersects the ordinate scale at a penetration value of 10 is taken as the softening or melting point of the resin. It will be appreciated that this point of intersection chosen herein as the softening point of the resin is an arbitrary one and that any other point of intersection within a reasonable range might be chosen. However, the softening point values herein given are in terms of the particular or precise testing method described herein.

So far as concerns subject matter, this application is a continuation-in-part of my application Serial No. 122,409, filed January 26, 1937.

I claim:

A thermo-adhesive tape comprising a thin, flexible base, one face of said base being coated with a thermo-adhesive composition containing polyvinyl resin, shellac, and a fluxing resin of lower melting point than said polyvinyl resin and capable of fluxing both said polyvinyl resin and said shellac; and the other face of said base being coated with a compound containing at least about 20% of a cellulose derivative and a resin selected from a class consisting of alkyd resins, phenolic resins, and vinyl resins; said fluxing resin having a melting point ranging from about 90° to about 130° F. and being prepared by condensing derivatives of the terpene series with polycarboxylic acid and esterifying with polyhydric alcohol and said thermo-adhesive composition having a melting point ranging from about 115° to 145° F. and comprising about 25% to 75% of said polyvinyl resin, about 15% to 50% of said shellac, and about 15% to 50% of said fluxing resin.

ERNEST L. KALLANDER.